United States Patent
Mochizuki et al.

(10) Patent No.: US 6,246,420 B1
(45) Date of Patent: *Jun. 12, 2001

(54) MOVEMENT DATA CONNECTING METHOD AND APPARATUS THEREFOR

(75) Inventors: Yoshiyuki Mochizuki; Toshiya Naka, both of Osaka (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/948,045

(22) Filed: Oct. 9, 1997

(30) Foreign Application Priority Data

Oct. 11, 1996 (JP) .................................................. 8-269595

(51) Int. Cl.[7] .................................................. G06T 13/00

(52) U.S. Cl. .......................................... 345/474; 345/473

(58) Field of Search ..................................... 345/473, 474

(56) References Cited

U.S. PATENT DOCUMENTS 5,926,190 * 7/1999 Turkowski et al. .................. 345/473

OTHER PUBLICATIONS

Munetoshi Unuma et al., "Fourier Principles for Emotion-based Human Figure Animation", Computer Graphics Proceedings, Annual Conference Series (SIGGRAPH 95) pp. 91–96.

Charles Rose et al., "Efficient Generation of Motion Transitions Using Spacetime Constraints", Computer Graphics Proceedings, Annual Conference Series (SIGGRAPH 96) pp. 147–154.

A. Witkin et al., "Motion Warping", Computer Graphics Proceedings, Los Angeles, Aug. 6–11, 1995, pp. 105–108.

R. Boulic et al., "Goal–Oriented Design and Corretion of Articulated Figure Motion with the Track System", Computers and Graphics, vol. 18, No. 4, Jul. 1, 1994, pp. 443–452.

K. Perlin "Real time Responsive Animation with Personality", IEEE Transactions on Visualization and Computer Graphics, vol. 1, No. 1, Mar. 1, 1995.

* cited by examiner

*Primary Examiner*—Matthew Luu
*Assistant Examiner*—Motilewa Good-Johnson
(74) *Attorney, Agent, or Firm*—Greenblum & Bernstein P.L.C.

(57) ABSTRACT

A motion data connecting method and apparatus for generating a smooth, natural motion connecting an advancing motion and a following motion with a short calculation time and without imposing a condition such as an assumption of cyclic movement on the connected motions is disclosed. A process for connecting an advancing motion and a following motion comprises three process blocks: a first process block for obtaining the current time position, a second process block for calculating a synthesized attitude angle, and a third process block for obtaining a synthesized joint angle.

31 Claims, 7 Drawing Sheets

MOVEMENT DATA CONNECTING METHOD AND APPARATUS THEREFOR

BACKGROUND OF THE INVENTION

The present invention relates to a method for generating animated figures in such fields as computer graphics and computerized animation, and relates particularly to a method for generating connections between a plurality of time series motion datum provided for animating an articulated rigid figure, and to an apparatus employment said motion data connecting method.

DESCRIPTION OF THE PRIOR ART

Expectations of realism in computer graphics and computer-generated animation have made it necessary to create naturally moving figures of humans and other animated subjects that are modelled using articulated rigid figures. To achieve this, human animators have manually generated three-dimensional time series [coordinate] data to express particular movements using key frame interpolation, or using motion capturing, a technique for capturing data representing actual movements by measuring the movements of a real subject performing a particular action.

Motion data is generated in motion units minimized to the smallest amount of information needed to express a particular movement. This is done both to reduce the required data processing time, and to objectify the motion data for reuse. Because these minimized motion data units are used, a plurality of fine motions described by the minimized motion data must be connected to construct a continuous movement that lasts an extended period of time.

The most primitive method of connecting this motion data is for animators to manually generate the connection data defining each link between adjacent motion data segments by estimating the connection between segments based on specialist knowledge. The manual nature of this task, however, means productivity is low. Each animator also estimates motions in three-dimensional space based on individual experience, often resulting in motion data connections causing the animated figure to move in an unnatural manner. To resolve these problems, the following two methods have been proposed for generating connection data controlling the motions of animated figures.

The first method proposes the automatic generation of connection data for cyclical locomotion (see Munetoshi Unuma, et al., "Fourier Principles for Emotion-based Human Figure Animation," SIGGRAPH95 Proceedings, pp. 91–96, 1995). The method of Unuma, et al., obtains a Fourier expansion of the time series data of before and after motions, extrapolates the motion in the connection period in the frequency domain, and then obtains the inverse Fourier expansion of the extrapolated motion. In short, this method generates motion connection data premised on predictions of periodic movements.

The second method proposes the generation of motion transitions not necessarily premised on periodic movements (see Charles Rose, et al., "Efficient Generation of Motion Transitions using Spacetime Constraints," SIGGRAPH96 Proceedings, pp. 147–154, 1996). This method generates motion transitions from space-time constraints of the connected before and after motions by estimating motion in a transition space using inverse kinematics, inverse dynamics, optimization.

The problem with the first method above is that it can only be applied to periodic motion, and its range of application is therefore limited. In addition, its dependence on Fourier expansions and inverse Fourier expansions imposes a significant burden on the calculation engine, and requires much processing time.

The latter method above also basically requires much processing time because the motion transition data is generated by extrapolating transitions from the before and after motions. Use of various numeric calculations also requires a long calculation time.

Connecting motions predicted from before and after motions is a problem of appropriate definition. As a result, an appropriate motion is produced only when the objective function of the optimization calculation matches the connection conditions at that point in time. Motion connection parameters, however, are determined individually according to the motions being connected (the before and after motions, e.g., changing from a walk to a run) and various conditions subjectively describing the motion (e.g., whether the walk is at a leisurely or brisk pace), and motion connection data resulting in unnatural movement is often generated because there are no motion connection parameters that are applicable under generalized conditions.

The described extrapolation method considers only torque consumption as an objective function, and applies an optimization algorithm to minimize torque (energy) consumption. Torque minimization, however, is a necessary condition and alone is not a sufficient condition, and therefore cannot be used to achieve smooth motion connections under all conditions. Torque minimization is not sufficient, for example, when a smooth movement or high speed movement is needed. The result of this is that the connected movements frequently appear unnatural despite the relatively long processing time required.

In both of the above described methods, therefore, connection motions are obtained by estimating the motion from the motions before and after the connection, and if the estimation is off, the resulting connection between motions appears unnatural. To compensate for this estimation problem, the first method above must assume that the before and after motions are periodic motions. The second method, however, describes no compensatory means, and simply frequently estimates poorly. The root of the problem leading to unnatural movements is, therefore, that in both methods described above motion connections are generated by some form of estimation.

The object of the present invention is therefore to provide a motion data connecting method and apparatus therefor for generating motion connection data linking motions before and after the connection so that the connection appears natural, the data can be generated in a short period of time, and it is not necessary to impose particular conditions on the motion, including an assumption of periodic movement.

Other objects and attainments together with a fuller understanding of the invention will become apparent and appreciated by referring to the following description and claims taken in conjunction with the accompanying drawings.

SUMMARY OF THE INVENTION

The object of the present invention is therefore to provide an imaging-device which solves these problems.

In order to achieve the aforementioned objective, a motion data connecting method for connecting, in an overlapping period, a first time series motion data indicative of movement of a subject having at least one joint, and a second time series motion data following and overlapping first time series motion data for a particular time; said motion data connecting method comprising the steps of: calculating a first overlapping period motion data of the first time series motion data, and a second overlapping period motion data of the second time series motion data, in the overlapping period, and one of the following: calculating a position of said subject at a current time based on the first and second overlapping period motion data, calculating an attitude angle of said subject at a current time based on the first and second overlapping period motion data, and calculating joint angle of a joint of subject at a current time based on the first and second overlapping period motion data.

DESCRIPTION OF THE PREFERRED EMBODIMENTS

Before proceeding to description of the preferred embodiments of the invention, some basic concepts relating to the motion data used to describe and control the movement of a person or other natural subject modelled using an articulated rigid figure in computer graphics and computer-generated animation are introduced first below with reference to FIG. 4.

Figure 4:
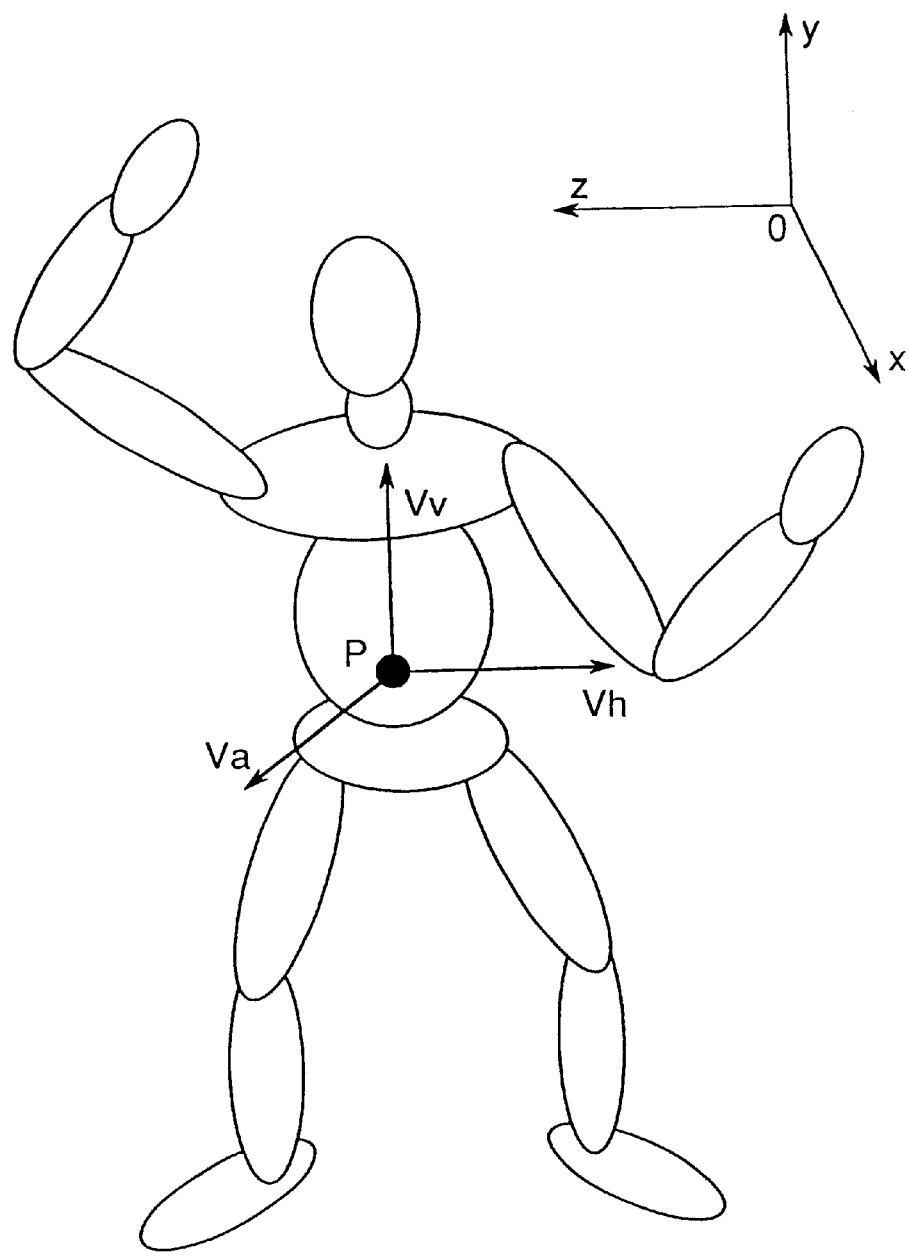
FIG. 4 is a figure used to describe the attitude vectors of the present invention.

The articulated rigid figure shown in FIG. 4 is modelled on a human figure, and motion data describing the movement of this figure is provided to the system as time series data. The motion data comprises 3D coordinate values indicative of the overall position of the figure; three attitude angles Aa, Av, and Ah used for controlling the attitude of the figure; and a slide vector and joint angle Aj, which are indicative of parallel movement and rotational movement, respectively, and are used for controlling the motion of each joint.

A point P is used to describe the overall position of a particular figure O, and is a fixed point defined specifically for each figure O. Three attitude vectors Va, Vv, and Vh are also defined for each figure O to represent the attitude (posture) of the figure where vector Va is the forward motion vector, Vv is the vertical motion vector, and Vh is the lateral (horizontal) motion vector. The specific position of each joint of the figure O can be determined using the coordinate system introduced by point P, and attitude vectors Va, Vv, and Vh.

This contrasts with conventional computer graphics in which each discrete object has an associated object coordinate system, i.e., a coordinate system specific to that object (figure), whereby object shapes are defined. The origin of the object coordinate system is used as point P to indicate the location of the figure O, and the unit vectors defining the object coordinate system are the attitude vectors.

The attitude of a figure O at a particular point in time is controlled using attitude angles Aa, Av, and Ah representing rotation around the three coordinate axes (x, y, z) of a world coordinate system. An attitude vector Va, Vv, Vh at a particular point in time can then be calculated by rotating the desired attitude vector an amount defined by attitude angle Aa, Av, or Ah from the starting vector around an appropriate coordinate axis x, y, z.

Joint movement is controlled using a sliding vector representing parallel motion in a local coordinate system defined for each joint, and rotation around the coordinate axes of this local coordinate system.

It should be noted that while the above concepts have been described with reference to an articulated rigid figure, the concepts and the invention shall not be limited to either rigid figures or articulated objects. More specifically, the above concepts and the invention are also applicable with flexible figures, single jointed figures, and combinations thereof.

The preferred embodiment of a motion data connecting method according to the present invention is described next below with reference to the accompanying figures.

Figure 1:
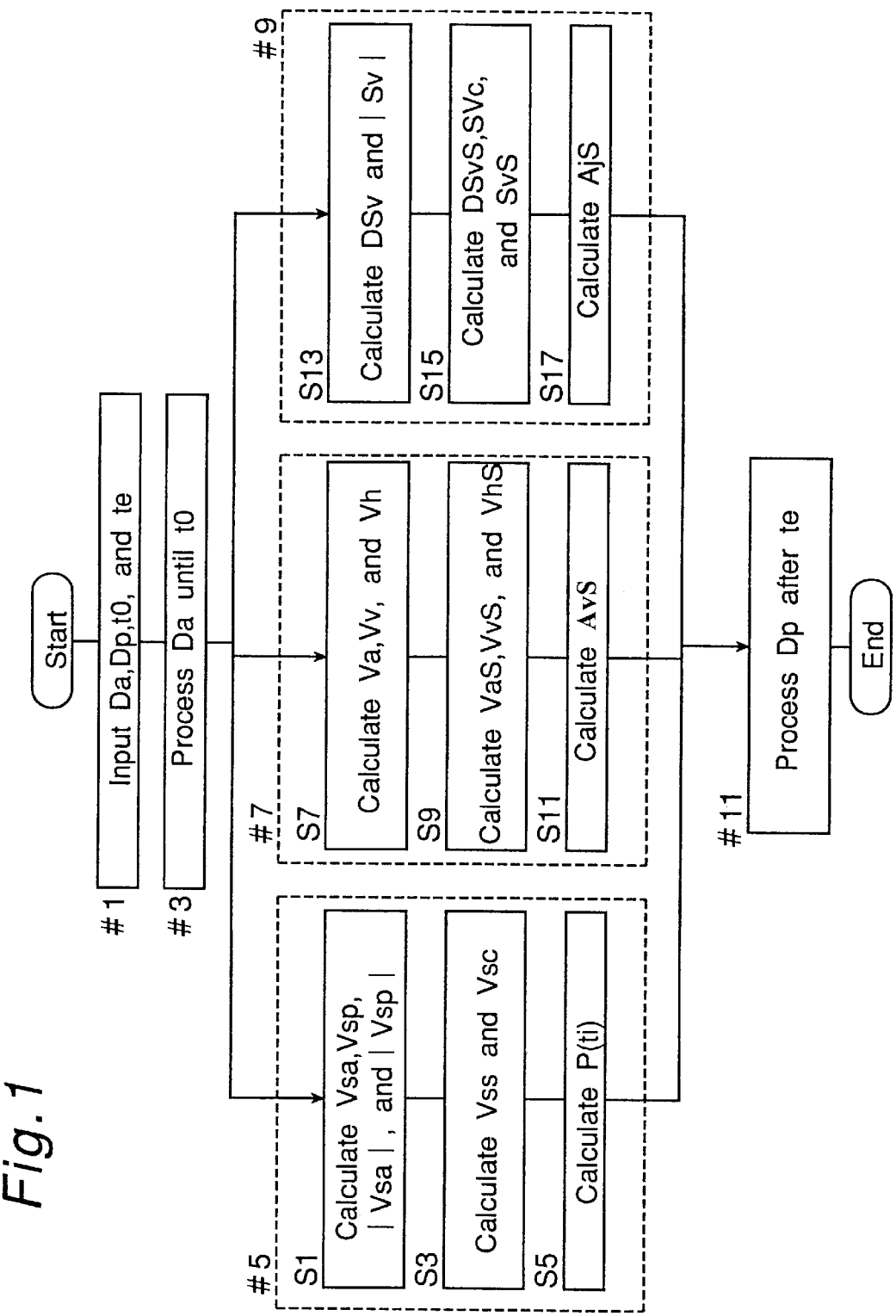
FIG. 1 is a block diagram used to describe the component processes of a motion data connecting method according to the present invention.

FIG. 1 is a flow chart used below to describe a motion data connecting method according to a preferred embodiment of the invention.

Figure 5:
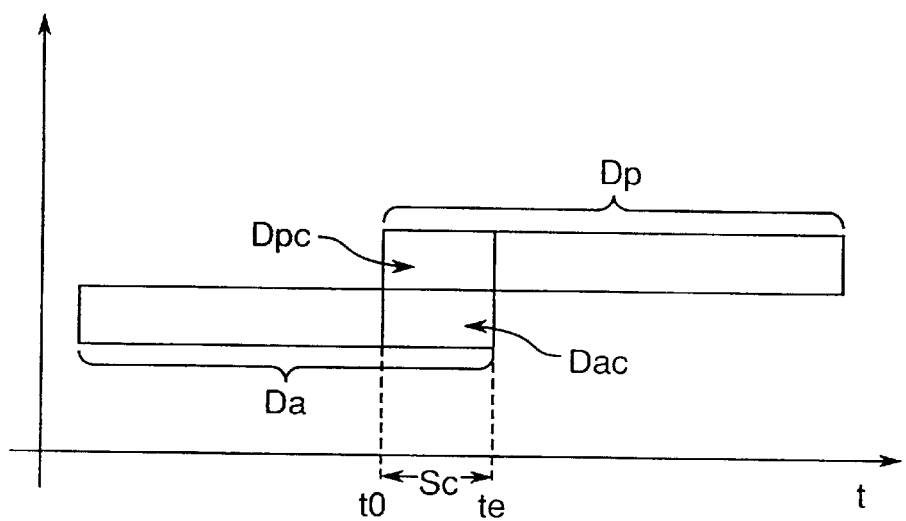
FIG. 5 is used to describe the time base relationship between motion data connected by the present invention.

Before proceeding with a detailed description of the motion data generation process, the temporal relationship in the connection of two motion data segments is described next with reference to FIG. 5 where two time series motion data segments, i.e., advancing motion data Da and following motion data Dp, are connected. It should be noted that if two motion data series can be connected, any number of motion data series can be connected. The following description is therefore limited for simplicity to connecting two motion data series.

The following motion data Dp has a specific starting time at time t0, and a particular time length ending after time t0. The advancing motion data Da has a specific starting time before time t0, and ends at time te. The two motion data Da and Dp therefore overlap during the period between time t0 and te, and this period of overlap is referred to the connection period Sc. The part of advancing motion data Da within the connection is period Sc is advancing connection period motion data Dac, and the part of following motion data Dp within the connection period Sc is following connection period motion data Dpc.

Returning to FIG. 1, it will be noted that the overall process of generating motion connection data is shown comprising a plurality of blocks, shown as blocks #1, 3, 5, 7, 9, and 11. It will be further noted that blocks #5, 7, and 9 are preferably executed as parallel processes, but it is not necessary for all three blocks to always be simultaneously executed.

The process executed by each block shown in FIG. 1 is described in detail below starting from block #1 at which information relating to the advancing motion data Da, following motion data Dp, and connection period Sc is input.

Processing that is unrelated to the connection data generation process is then applied to the advancing motion data Da until time t0, i.e., until the beginning of the connection period Sc (block #3). The operations processed by blocks #5, 7, and 9 are then performed.

Block #5 has three steps. At step S1 the velocity vector of the advancing motion in connection period Sc is calculated by obtaining the difference between the 3D coordinate data of point P of figure O in advancing connection period motion data Dac. More specifically, the velocity vector is obtained as the difference between point P of figure O at time ti and point P of figure O at time ti+1. The velocity vector of the following motion is similarly calculated in the following connection period motion data Dpc. The speed component is then obtained from the velocity vector, and is defined as the length of the calculated velocity vector (vector Vs). Note that the velocity vector of advancing motion data Da in 3D space is expressed as velocity vector Vsa, and the speed of vector vsa is |Vsa|. The velocity of following motion data Dp is likewise expressed as velocity vector Vsp, and the speed of vector Vsp is |Vsp|.

The synthesized velocity vector VsS obtained by connection function Fc from the advancing motion velocity vector Vsa and following motion velocity vector Vsp calculated in step S1 is then calculated in step S3. The synthesized velocity VsS can be obtained from equation (1)

$$VsS = Vsa \times Fc + Vsp \times (1-Fc) \quad (1)$$

where the connection function Fc is a differentiable, monotonic decreasing function ranging from 1 at the starting time of connection period Sc to 0 at the end of connection period Sc where a value in the connection period Sc is 180 degrees rotationally symmetric to a value at a midpoint time of the connection period Sc. Note that equation (1) is a proportional parts equation of connection function values. As a result, when connection function Fc is nonlinear with respect to time, the distribution also varies nonlinearly with respect to time.

When time t is normalized as t=(T−t0)/)te−t0) where t0 is the starting time of the connection period Sc, te is the end time of the connection period Sc, and T is the current time, the following connection functions Fc using time t as an independent variable can be defined.

Fc1(t)=1−t
Fc2(t)=(1+cos(pt))/2
Fc3(t)=((6t+3)t+1)(1−t)(1−t)(1−t)
Fc4(t)=((((70t+35)t+15)t+5)t+1)(1−t)(1−t)(1−t)(1−t)

Using connection function Fc1(t) results in a linear synthesis, and continuity of movement within connection period Sc cannot be assured.

Using Fc2(t), Fc3(t), or Fc4(t) results in a nonlinear synthesis with Fc2(t) assuring continuity through one connection, Fc3(t) assuring continuity through two connections, and Fc4(t) through four connections.

More specifically, despite the similarity of the advancing motion and following motion functions, Fc2(t) assures the continuity of the vector of the synthesized velocity vector VsS (equivalent to acceleration) in the connection period Sc; Fc3(t) assures the continuity of the acceleration (equivalent to briskness) of the synthesized velocity vector vsS; and Fc4(t) assures the continuity of the derivative of the briskness of the synthesized velocity vector VsS.

When the connection function Fc is a differentiable, monotonic decreasing function ranging from 1 at the starting time of connection period Sc to 0 at the end of connection period Sc where a value in the connection period Sc is 180 degrees rotationally symmetric to a value at a midpoint time of the connection period Sc., the synthesized velocity vector VsS can be obtained from equation (2)

$$VsS = Vsa \times (1-Fc) + Vsp \times Fc \quad (2)$$

When time t is normalized as described above, the following connection functions Fc can be defined.

Fc1'(t)=t
Fc2'(t)=1−(1+cos(pt))/2
Fc3'(t)=1−((6t+3)t+1)(1−t)(1−t)(1−t)
Fc4'(t)=1−((((70t+35)t+15)t+5)t+1)(1−t)(1−t)(1−t)(1−t)

Note that the behavior of these connection functions Fc1'(t), Fc2'(t), Fc3'(t), and Fc4'(t) are the same as Fc1(t), Fc2(t), Fc3(t), and Fc4(t) above.

A synthesized speed Vsc is also calculated from advancing motion speed |Vsa| and following motion speed |Vsp| using a synthesis operation similar to that used to calculate synthesized velocity vector VsS. It should be noted, however, that the connection functions Fc used to calculate synthesized speed Vsc do not need to be the same connection functions used to calculate the synthesized velocity vector VsS.

It should be further noted that while the connection functions Fc are appropriately preselected in consideration for the smoothness of the connection and required calculating time, the applied connection function can be automatically selected as described below.

Figure 7:
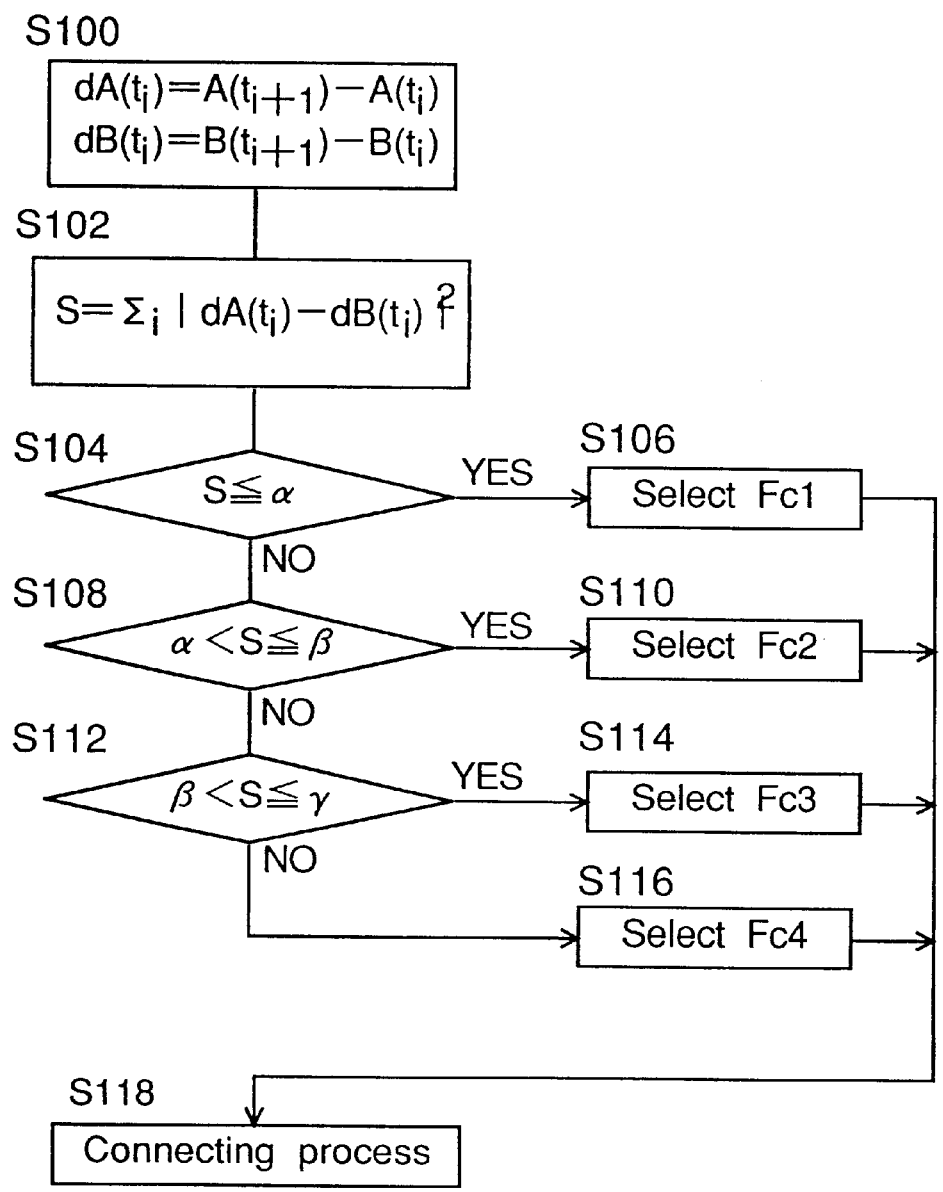
FIG. 7 is a flow chart used to describe the synthesized velocity vector calculation operation using an automatically selected connection function Fc according to the present invention.

FIG. 7 is a flow chart used to describe an exemplary process for calculating the synthesized velocity vector VsS when the applied connection function Fc is automatically selected.

The process starts by calculating the difference dA(t) (equivalent to acceleration) in the advancing motion velocity vector Vsa in the connection period Sc, and the difference dB(t) in the following motion velocity vector Vsp (step S100).

The sum S of the square of |dA(t)−dB(t)| across the connection period Sc is calculated next (step S102).

Sum S is then compared with previously experimentally determined threshold values α, β, γ in steps S104, S108, and S112.

If sum S is less than or equal to α (step S104), connection function Fc1(t) is automatically selected (step S106). If not, sum S is tested again.

If sum S is greater than α and less than or equal to β (step S108), connection function Fc2(t) is automatically selected (step S110). If not, sum S is tested again.

If sum S is greater than β_and less than or equal to γ_(step S112), connection function Fc3(t) is automatically selected (step S114). If not, sum S is greater than γ, and connection function Fc4(t) is automatically selected (step S116).

In this automatic selection process the sum S represents the similarity of the functions, i.e., the closeness of differential coefficients where a smaller value indicates a greater similarity. When the motion in the advancing motion segment is similar to the motion in the following motion segment, the selection process shown in FIG. 7 selects the function Fc1 requiring the least computation time (cost). It follows that as the similarity of motion decreases, computation time increases, but a connection function Fc enabling a smoother, more natural connection can be selected.

It is therefore possible by means of the present invention to automatically select a connection function Fc achieving an appropriate balance between required computation time and process results.

It will also be obvious that when the process shown in FIG. 7 is performed prior to computing equation (2) above, the procedure can be modified to select Fc1', Fc2', Fc3', and Fc4' instead of Fc1, Fc2, Fc3, and Fc4.

Referring again to FIG. 1, the position P(ti) at the present time ti is then calculated using equation (3) (step S5).

$$P(ti)=P(ti-1)+VsS(ti-1)\times|Vsc(ti-1)|/|VsS(ti-1)| \quad (3)$$

where (ti−1) is the previous time, VsS(ti−1) is the synthesized velocity vector at previous time (ti−1), and |VsS(ti−1)| is a scalar of the synthesized velocity vector at previous time (ti−1).

After step S5 is completed, block #11 is processed.

In block #7, the advancing attitude vectors Vaa, Vva, and Vha are calculated from the advancing motion attitude angles Aaa, Ava, and Aha of the advancing connection period motion data Da. In addition, the following attitude vectors Vap, Vvp, and Vhp are calculated from the attitude angles Aaac, Avac, and Ahac of the connection period motion data Dac and the attitude angles Aapc, Avpc, and Ahpc of the connection period motion data Dpc (step S7).

The synthesized attitude vectors VaS, VvS, and VhS are then calculated from advancing attitude vectors Vaa, Vva, and Vha and following attitude vectors Vap, Vvp, and Vhp by means of an operation similar to that used for calculating synthesized velocity vector VsS. (step S9)

It should be noted, however, that the connection functions Fc used to calculate synthesized attitude vectors VaS, VvS, and VhS do not need to be the same connection functions used to calculate the synthesized velocity vector VsS, and can be appropriately selected in consideration for the smoothness of the connection and required calculating time.

The synthesized attitude angle AvS is then calculated from the synthesized attitude vectors VaS, VvS, and VhS (step S11). The relationship between the synthesized attitude vectors VaS, VvS, and VhS and synthesized attitude angle AvS is generally one-to-many, and therefore cannot be uniquely determined without some constraint. A unique determination is possible, however, by defining an angle of rotation for the three attitude vectors Va, Vv, and Vh. For example, rotation angle Avv of vertical motion vector Vv can be defined as greater than or equal to −90 degrees and less than or equal to 90 degrees before solving for synthesized attitude angle AvS. It should be noted that this type of constraint does not affect the calculation of synthesized attitude vectors VaS, VvS, and VhS from synthesized attitude angle AvS.

After completing block #7, operation proceeds to block #11.

In block #9, the advancing sliding direction DsVac and advancing sliding distance |Svac| are calculated from the sliding vector Svac of the joint associated with the advancing connection period motion data Dac, and the following sliding direction DsVpc and following sliding distance |Svpc| are calculated from the sliding vector Svpc of the following connection period motion data Dpc. (step S13)

It should be noted that sliding direction DsV is sliding vector Sv or a vector normalized to length 1, and sliding distance |Sv| is the length of sliding vector Sv.

The synthesized sliding direction DsVS and synthesized sliding distance SVc are next calculated from advancing sliding direction DsVac and following sliding direction DsVpc, and advancing sliding distance |Svac| and following sliding distance |Svpc| by means of an operation similar to that for calculating synthesized velocity vector VsS. (step S15).

It should be noted, however, that the connection functions Fc used do not need to be the same connection functions used to calculate the synthesized velocity vector VsS, and can be appropriately selected in consideration for the smoothness of the connection and required calculating time.

The synthesized sliding vector SvS is then calculated based on the synthesized sliding direction DsVS and synthesized sliding distance SVc using equation (4).

$$SvS=DsVS\times SVc/|DsVS| \quad (4)$$

where |DsVS| is the length of synthesized sliding direction DsVS.

The synthesized joint angle AjS is then calculated from the joint angle Ajac in the advancing connection period motion data Dac and the joint angle Ajpc in the following connection period motion data Dpc (step S17) using a synthesis similar to that for calculating the synthesized velocity vector VsS.

It should be noted, however, that the connection functions Fc used do not need to be the same connection functions used to calculate the synthesized velocity vector VsS, and can be appropriately selected in consideration for the smoothness of the connection and required calculating time. Automatic selection of an appropriate function is also possible as described above.

After step S17 of block #9 is completed, block #11 is processed.

Block #11 converts the motion data following connection period Sc in following motiQn data Dp so that the overall global movement of figure O conforms to the connection motion.

As will be obvious from the above description of the invention, synthesizing the advancing connection period motion data and following connection period motion data is equivalent to generating connection motion.

Figure 6:
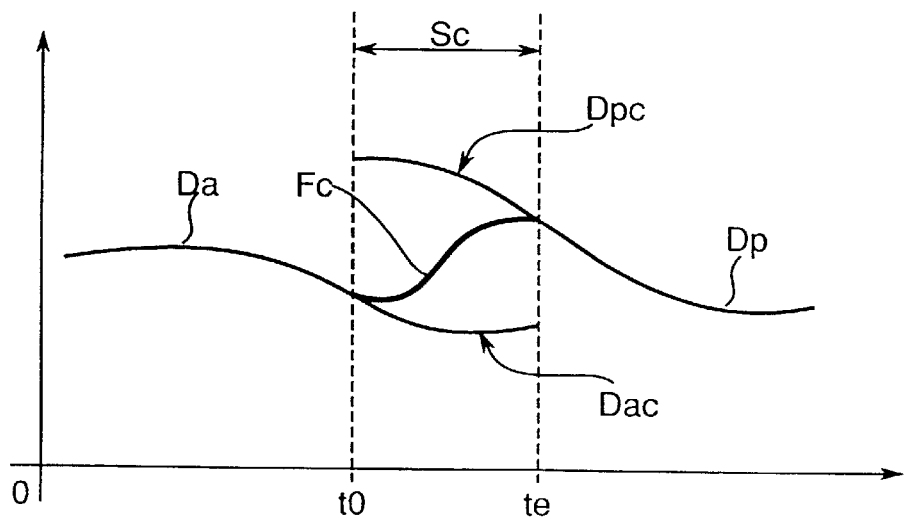
FIG. 6 is used to describe motion data synthesis using a connection function Fc according to the present invention.

A connection generated using the connection functions Fc described above is shown in FIG. 6. Note that the end (at time t0) of the advancing motion data Da, and the beginning of following motion data Dp (at time te), are smoothly connected in connection period Sc by means of the connection function Fc selected in the process described above.

Figure 2:
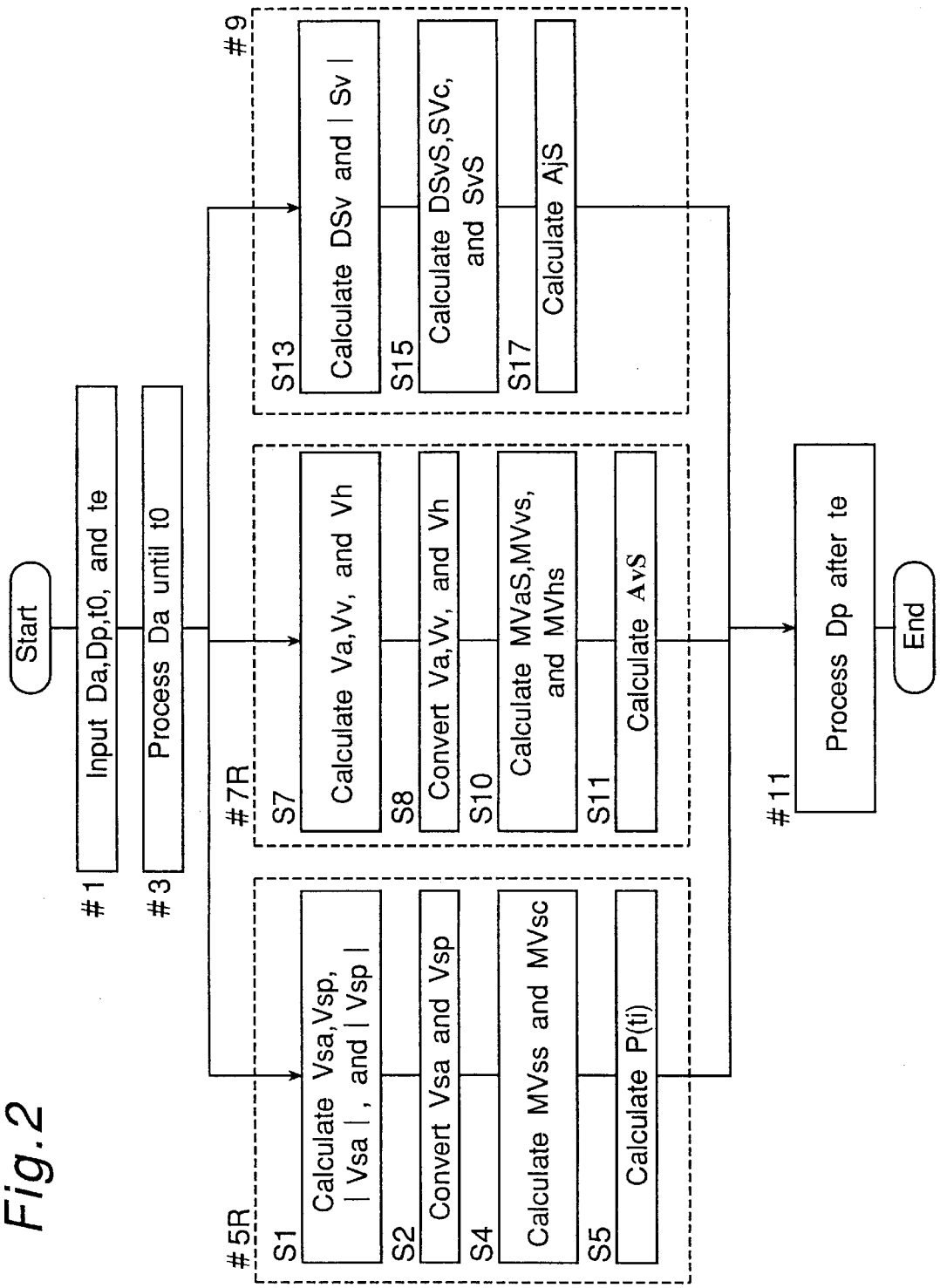
FIG. 2 is a block diagram used to describe the component processes of a motion data connecting method according to an alternative embodiment of the present invention.

A motion data connecting method according to an alternative embodiment of the present invention is described next below with reference to the accompanying FIG. 2. It will be noted that the flow chart in FIG. 2 is substantially identical to that in FIG. 1. It differs, however, in the insertion of a step S2 and a step S4 in block #5 of FIG. 1, which is thus labelled as block #5R, and the insertion of a step S8 and a step S10 in block #7 of FIG. 1, which is thus likewise labelled block #7R. The differences in operation only are therefore described below.

More specifically, this embodiment differs in that the conversion amount in the motion direction of the advancing motion data Da at a particular time is defined as advancing motion conversion amount MAa, and the conversion amount in the motion direction of the following motion data Dp is defined as following motion conversion amount MAp.

At step S2 in block #5R, the velocity vector Vsa of advancing motion calculated in step S1 is converted to advancing motion conversion amount MAa at the corresponding time. This conversion can be obtained by a rotation matrix by obtaining the product of this rotation matrix and velocity. The velocity vector Vsp of the following motion is likewise converted to following motion conversion amount MAp at the corresponding time.

A synthesized vector MVss is then calculated by applying a connection function Fc to the advancing motion conversion amount MAa and following motion conversion amount MAp calculated in step S2. This calculation is made using the same connection functions Fc used to calculate the synthesized vector in FIG. 1.

A synthesized speed MVsc is also calculated from the speed of the advancing motion and the speed of the following motion using the same operation used to calculate the synthesized vector.

It should be noted, however, that the connection functions Fc used do not need to be the same connection functions used to calculate the synthesized velocity vector VsS, and can be appropriately selected in consideration for the smoothness of the connection and required calculating time.

At step S8 in block #7R, the advancing attitude vectors Vaa, Vva, and Vha are converted to advancing motion attitude vectors MVaa, MVva, and MVha at the corresponding time, and following attitude vectors Vap, Vvp, and Vhp are converted to following motion attitude vectors MVap, MVvp, and MVhp at the corresponding time. Note that as in step S2 above, this conversion can be accomplished by obtaining the product of a rotation matrix and attitude vector.

In step S10, the motion attitude vectors MVaa, MVva, and MVha, and MVap, MVvp, and MVhp, obtained in step S8 are used to calculate synthesized motion attitude vectors MVaS, MVvS, and MVhS using an operation similar to the synthesized vector calculation described above.

It should be noted that this motion data connecting method is able to smoothly connect motions even when, for example, the connected advancing and following motions have different directions. A smooth connection is accomplished in this case by adjusting the direction of the connection data.

It should be noted, however, that the connection functions do not need to be the same connection functions used to calculate the synthesized velocity vector, and can be appropriately selected in consideration for the smoothness of the connection and required calculating time.

Figure 3:
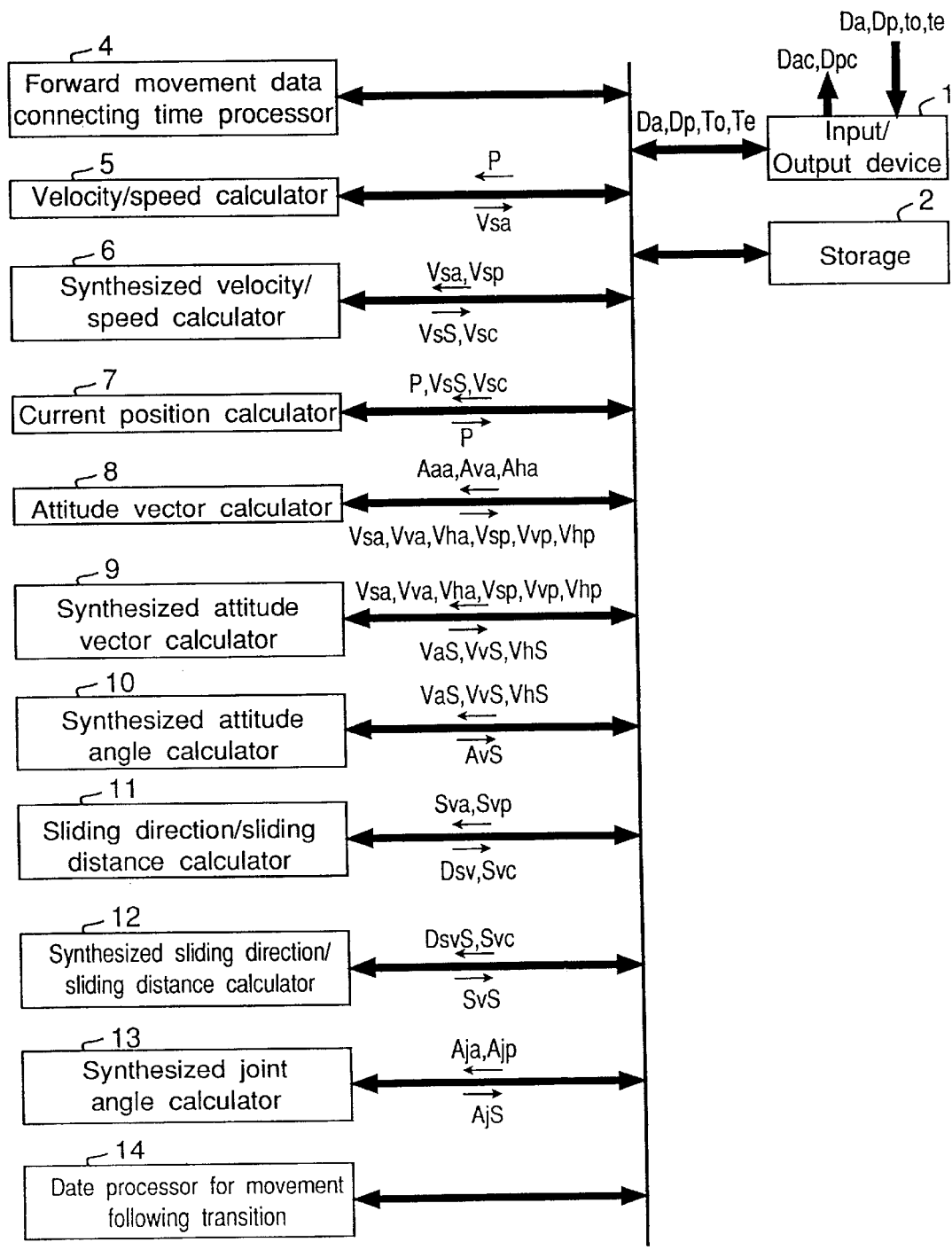
FIG. 3 is a block diagram used to describe the structure and operation of a motion data connection apparatus according to the present invention.

Referring next to FIG. 3, an apparatus for applying a motion data connecting method according to the present invention is described below. As shown in FIG. 3, a motion data connection apparatus 100 according to the present invention comprises connected to a common data bus 3 an input/output device 1, storage 2, forward movement data connection time processor 4, vector/speed calculator 5, synthesized vector/speed calculator 6, current position calculator 7, attitude vector calculator 8, synthesized attitude vector calculator 9, synthesized attitude angle calculator 10, sliding direction/sliding distance calculator 11, synthesized sliding direction/sliding distance calculator 12, synthesized joint angle calculator 13, and data processor for movement following connection 14.

The advancing motion data Da, following motion data Dp, and connection times t0 and te input from an external source to I/O device 1 are stored thereby over bus 3 to storage 2. Processing that is unrelated to the connection data generation process is then applied to the advancing motion data Da stored to the storage 2 until time t0, i.e., until the beginning of the connection period Sc, by forward movement data connection time processor 4. After the data is processed, it is written back to storage 2 via bus 3.

The velocity/speed calculator 5 reads the overall position P of the figure O in both the advancing connection period motion data Dac and following connection period motion data Dpc from storage 2 via the bus 3. The velocity/speed calculator 5 then calculates the velocity vector Vsa by obtaining the difference between the 3D coordinate data of point P of figure O in advancing connection period motion data Dac.

More specifically, this vector is obtained as the coordinate difference between point P of figure O at time ti and point P of figure O at time ti+1. Note that this vector is a vector in three-dimensional space. The velocity vector vsp of the following motion is similarly calculated in the following connection period motion data Dpc. The speed component is then obtained from the vector, and is defined as the length of the calculated vector (vector Vs).

The calculated vector and speed values are then written to storage 2 via bus 3.

A synthesized vector/speed calculator 6 then reads the advancing motion velocity vector Vsa and following motion velocity vector Vsp from storage 2 via bus 3, and calculates the synthesized velocity vector VsS using a connection function Fc as described above with reference to step S3, FIG. 1. It should be noted that operation of the synthesized vector/speed calculator 6 conforms to step S3, FIG. 1, even when the connection function Fc is automatically selected.

A synthesized speed Vsc is also calculated from advancing motion speed |Vsa| and following motion speed |Vsp| using a synthesis operation similar to that used to calculate synthesized velocity vector VsS. It should be noted, however, that the connection functions Fc used to calculate synthesized speed Vsc do not need to be the same connection functions used to calculate the synthesized velocity vector VsS.

The calculated synthesized velocity vector VsS and synthesized speed Vsc values are then written to storage 2 via bus 3.

The current position calculator 7 then accesses the storage 2 via bus 3 to read the overall position P of the FIG. O in both the advancing connection period motion data Dac and following connection period motion data Dpc, synthesized velocity vector VsS, and synthesized speed vsc to calculate the position P of the figure O in the connection motion from equation (3). The calculated position P of the figure O in the connection motion is then stored to storage 2 via bus 3.

The attitude vector calculator 8 then accesses the storage 2 via bus 3 to read the advancing motion attitude angles Aaa, Ava, and Aha of the advancing connection period motion data Dac, and the attitude angles Aapc, Avpc, and Ahpc of the following motion connection period motion data Dpc. It then calculates advancing attitude vectors Vaa, Vva, and Vha from the advancing motion attitude angles Aaa, Ava, and Aha, and calculates the following attitude vectors Vap, Vvp, and Vhp from the attitude angles Aaac, Avac, and Ahac.

It should be noted, however, that the connection functions Fc used do not need to be the same connection functions used to calculate the synthesized velocity vector.

The calculated synthesized attitude vectors are then written to storage 2 via bus 3.

The synthesized attitude angle calculator 10 then accesses the storage 2 via bus 3 to read the synthesized attitude vectors VaS, VvS, and VhS, and calculates the synthesized attitude angle AvS by means of the process described in step S11 of FIG. 1. The synthesized attitude angle AvS is then written to storage 2 via bus 3.

The sliding direction/sliding distance calculator 11 then accesses the storage 2 via bus 3 to read the sliding vector Svac of the joint associated with the advancing connection period motion data Dac, and the sliding vector Svpc of the following connection period motion data Dpc.

The advancing sliding direction DsVac and advancing sliding distance |Svac| are then calculated from the sliding vector Svac of the joint associated with the advancing connection period motion data Dac, and the following sliding direction DsVpc and following sliding distance |Svpc| are calculated from the sliding vector Svpc of the following connection period motion data Dpc.

The calculated sliding direction DsV and sliding distance |Sv| are then written to storage 2 via bus 3.

The synthesized sliding direction/sliding distance calculator 12 then accesses the storage 2 via bus 3 to read the advancing sliding direction DsVac and following sliding direction DsVpc, and advancing sliding distance |Svac| and following sliding distance |Svpc|, and calculate the synthesized sliding direction DsVS and synthesized sliding distance SVc by means of an operation similar to that for calculating synthesized velocity vector VsS.

The synthesized sliding vector SvS is then calculated based on the synthesized sliding direction DsVS and synthesized sliding distance SVc using equation (4).

The calculated synthesized sliding vector SvS is then written to storage 2 via bus 3.

The synthesized joint angle calculator 13 then accesses the storage 2 via bus 3 to read the joint angle Ajac in the advancing connection period motion data Dac and the joint angle Ajpc in the following connection period motion data Dpc, and calculate the synthesized joint angle AjS using a synthesis similar to that for calculating the synthesized velocity vector VsS.

The synthesized joint angle AjS is then written to storage 2 via bus 3.

The data processor for movement following connection 14 then accesses the storage 2 via bus 3 to read the following motion data for the period following the connection segment, and convert the motion data following connection period Sc so that the overall global movement of figure O conforms to the connection motion. The data is then written to storage 2 via bus 3.

The before and after motion connection data Dc connecting the advancing motion data and the following motion data is then read from storage 2 by I/O device 1, and output to an external device.

It should be noted that the processes executed by the embodiments described with reference to FIG. 1 and FIG. 2 can be accomplished in operating time units. In this case, however, the processes are executed in operating time unit loops.

Figure 8:
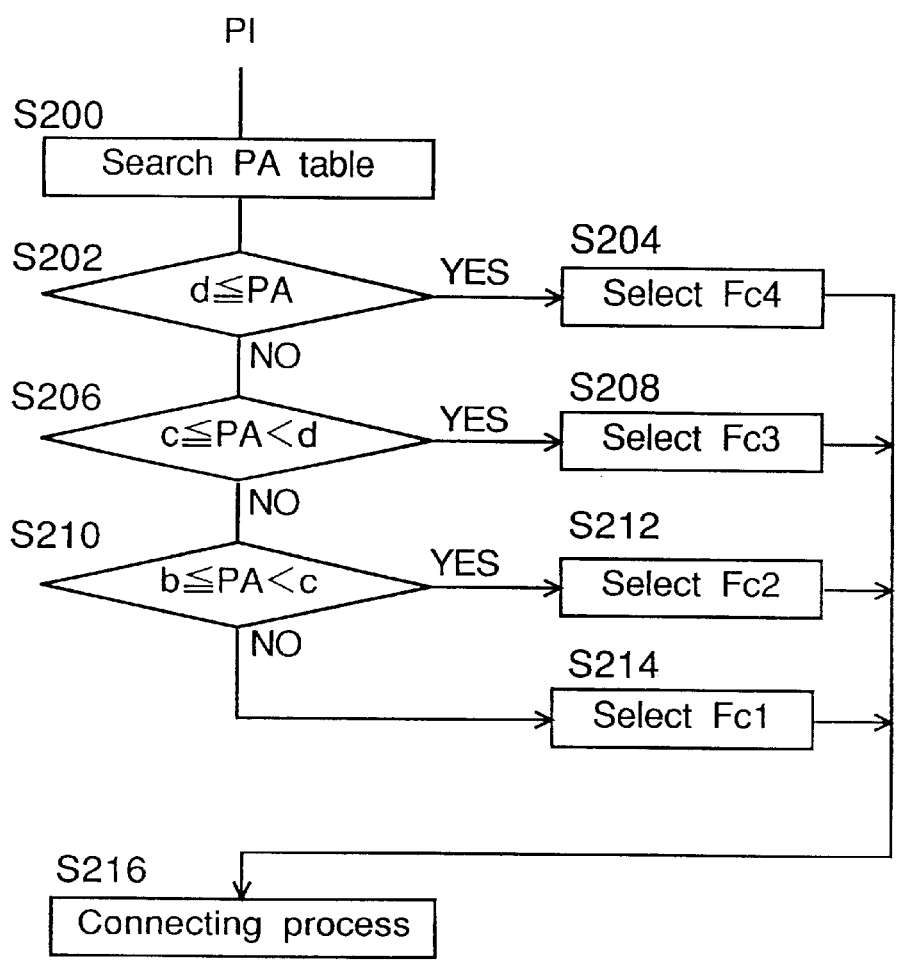
FIG. 8 is used to describe the process for automatically selecting a connection function Fc with real-time processing.

Real-time automatic selection of a connection function Fc is described next with reference to FIG. 8. The processing power PA of the computer or processor (MPU) to be used is first obtained, and a lookup table whereby said processing power values PA can be searched by an identifier PI unique to the computer or MPU is compiled. The processing power values PA are determined for each connection function Fc where, for example, if the processing power required to compute connection function Fc1 is "a", Fc2 is "b", Fc3 is "c", and Fc4 is "d", the relationship between the processing power required to compute each function is a<b<c<d.

Before the connection process is begun, an identifier PI is entered and the table is searched (S200). The processing power PA fetched from the table is then compared with the processing power rating of each connection function Fc. If PA is greater than or equal to d (S202), connection function Fc4 is automatically selected (S204).

If PA is greater than or equal to c or less than d (S206), connection function Fc3 is automatically selected (S208).

If PA is greater than or equal to b or less than c (S210), connection function Fc2 is automatically selected (S212). Otherwise, i.e., if PA is less than b, connection function Fc1 is automatically selected (S214).

As a result, a connection function Fc optimally selected according to the processing power of the processing device being used can be automatically selected.

As described above, synthesizing advancing connection period motion data and following connection period motion data by means of a motion data connecting method and apparatus therefor according to the present invention is equivalent to generating connection motion. More specifically, the present invention does not infer a non-existent motion at a particular point in time, but determines a specific connection motion from existing motion data. A natural connection motion between an advancing motion and a following motion connected by the motion data connecting method of the invention can therefore be generated with a short calculation time and without imposing a condition such as an assumption of cyclical movement on the connected motions.

When the motion data connection process of the present invention is applied in time units, computer graphics and computer-generated animation in which motions are connected in real-time can be achieved by combining the motion data connection process with a drawing process. Application with artificial life systems is also possible when combined with an autonomous control system.

The present invention is a fundamental technology upon which important future technologies can be developed. Examples of other applications for the technology provided by the present invention include interactive games and agents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motion data connecting method for connecting, in an overlapping period, a first time series motion data indicative of movement of a subject having at least one joint, and a second time series motion data following and overlapping first time series motion data for a particular time, said motion data connecting method comprising the steps of:

calculating a first overlapping period motion data of the first time series motion data, and a second overlapping period motion data of the second time series motion data, in the overlapping period, and one of the following:

calculating a position of said subject at a current time based on the first and second overlapping period motion data, calculating an attitude angle of said subject at a current time based on the first and second overlapping period motion data, and calculating a joint angle of a joint of said subject at a current time based on the first and second overlapping period motion data.

2. The motion data connecting method according to claim 1, wherein calculating a position of said subject at a current time based on the first and second overlapping period motion data comprises:

calculating a first velocity vector and a first speed of subject in overlapping period based on first overlapping period motion data, calculating a second velocity vector and a second speed of subject in overlapping period based on second overlapping period motion data, synthesizing first velocity vector and second velocity vector based on a particular connection function to calculate a third velocity vector of subject in overlapping period, synthesizing first speed and second speed based on said connection function to calculate a third speed of subject in overlapping period, and calculating the position of subject at current time based on third velocity vector and third speed.

3. The motion data connecting method according to claim 1, wherein calculating an attitude angle AvS of said subject at a current time based on the first and second overlapping period motion data further comprises:

calculating first attitude vector of subject in overlapping period based on first overlapping period motion data, calculating a second attitude vector of subject in overlapping period based on second overlapping period motion data, calculation a third attitude vector of subject in overlapping period by synthesizing first attitude vector and second attitude vector based on a particular connection function, and calculating a third attitude vector indicative of an attitude of subject in overlapping period based on the third attitude vector.

4. The motion data connecting method according to claim 1, wherein calculating a joint angle further comprises:

calculating a sliding vector of a joint of the subject at the current time based on the first and second overlapping period motion data;

calculating a first sliding direction and a first sliding distance of a joint of the subject in the overlapping period based on first overlapping period motion data, calculating a second sliding direction and a second sliding distance of a joint of the subject in the overlapping period based on second overlapping period motion data, calculating a third sliding direction, a third sliding distance, and the sliding vector of the subject in the overlapping period by synthesizing the first sliding direction, the first sliding distance, the second sliding direction, and the second sliding distance, and calculating the sliding vector and a third joint angle of the subject in the overlapping period by synthesizing based on a connection function a first joint angle of first overlapping period motion data and a second joint angle of second overlapping period motion data.

5. A motion data connecting method for processing two time series motion data segments indicative of an overall position, attitude angle, a sliding vector of a joint, and a joint angle of an articulated figure at a particular time, where a first time series motion data segment comprises advancing motion data and a second time series motion data segment comprises following motion data, motion data of a connection period unit from an end of the advancing motion data is advancing connection period motion data, and motion data of a connection period unit from a beginning of the following motion data is following connection period motion data, said motion data connecting method comprising:

calculating an overall position of an articulated rigid figure at a current time by calculating a velocity vector and speed from an overall position in the advancing connection period motion data, calculating a velocity vector and speed from an overall position in the following connection period motion data, calculating a synthesized velocity vector by applying a velocity vector connecting function to the velocity vector calculated from the advancing connection period motion data, and the velocity vector calculated from the following connection period motion data, calculating a synthesized speed by applying a speed connecting function to the speed calculated from the advancing connection period motion data, and the speed calculated from the following connection period motion data, and adding a progression velocity vector, of which the direction is the synthesized velocity vector and the scalar is the synthesized speed, to the overall position of an articulated rigid figure at a time one before the current time;

calculating an overall attitude angle of the articulated rigid figure at a current time by calculating an attitude vector from an overall attitude angle of the advancing connection period motion data, calculating an attitude vector from an overall attitude angle of the following connection period motion data, calculating a synthesized attitude vector by synthesizing by means of an attitude vector connection function, the attitude vector calculated from the advancing connection period motion data, and the attitude vector calculated from the following connection period motion data, and converting the synthesized attitude vector to a synthesized attitude angle; and calculating a sliding vector of a joint and joint angle of the articulated rigid figure at the current time by calculating a sliding direction and sliding distance from a sliding vector of a joint of the advancing connection period motion data, calculating a sliding direction and sliding distance from a sliding vector of a joint of the following connection period motion data, calculating a synthesized sliding direction and synthesized sliding distance by synthesizing the sliding direction and sliding distance of a joint of the advancing connection period motion data, and the sliding direction and sliding distance of a joint of the following connection period motion data, using a sliding direction connection function and a sliding distance connection function, calculating a synthesized sliding vector from the synthesized sliding direction and synthesized sliding distance, and calculating a synthesized joint angle by applying a joint angle connection function to a joint angle of the advancing connection period motion data and a joint angle of the following connection period motion data.

6. A motion data connecting method for processing two time series motion data segments indicative of an overall position, attitude angle, a sliding vector of a joint, and joint angle of an articulated figure at a predetermined time, where a first time series motion data segment comprises advancing motion data and a second time series motion data segment comprises following motion data, a conversion amount in the motion direction of the advancing motion data provided at each time comprising the advancing motion conversion amount, a conversion amount in the motion direction of the following motion data provided at each time comprising the following motion conversion amount, motion data of a connection period unit from an end of the advancing motion data comprising advancing connection period motion data, and motion data of a connection period unit from a beginning of the following motion data comprising following connection period motion data, said motion data connecting method comprising:
calculating an overall position of an articulated rigid figure at a current time by
calculating a velocity vector and speed from an overall position in the advancing connection period motion data,
calculating a velocity vector and speed from an overall position in the following connection period motion data,
converting the velocity vector calculated from the advancing connection period motion data using the advancing motion conversion amount at the corresponding time, converting the velocity vector calculated from the following connection period motion data using the following motion conversion amount at the corresponding time, and then calculating a synthesized velocity vector by applying a connecting function to the converted velocity vector values,
calculating a synthesized speed by applying said connecting function to the speed calculated from the advancing connection period motion data, and the speed calculated from the following connection period motion data, and
adding a progression velocity vector, of which the direction is the synthesized velocity vector and the scalar is the synthesized speed, to the overall position of an articulated rigid figure at a time one before the current time;
calculating an overall attitude angle of the articulated rigid figure at the current time by
calculating an attitude vector from an overall attitude angle of the advancing connection period motion data,
calculating an attitude vector from an overall attitude angle of the following connection period motion data,
converting the attitude vector calculated from the advancing connection period motion data using the advancing motion conversion amount at the corresponding time, converting the attitude vector calculated from the following connection period motion data using the following motion conversion amount at the corresponding time, and then calculating a synthesized attitude vector by applying a connection function to the converted attitude vectors, and
converting the synthesized attitude vector to a synthesized attitude angle;
calculating the synthesized attitude vector to a synthesized attitude angle; and
calculating a sliding vector of a joint and joint angle of the articulated rigid figure at the current time by
calculating a sliding direction and sliding distance from a sliding vector of a joint of the advancing connection period motion data,
calculating a sliding direction and sliding distance from a sliding vector of a joint of the following connection period motion data,
calculating a synthesized sliding direction and synthesized sliding distance by synthesizing the sliding direction and sliding distance of a joint of the advancing connection period motion data, and the sliding direction and sliding distance of a joint of the following connection period motion data, using a connection function,
calculating a synthesized sliding vector from the synthesized sliding direction and synthesized sliding distance, and
calculating a synthesized joint angle by applying a connection function to a joint angle of the advancing connection period motion data and a joint angle of the following connection period motion data.

7. A motion data connecting method for processing two time series motion data segments indicative of an overall position, attitude angle, a sliding vector of a joint, and joint angle of an articulated figure at a particular time, where a first time series motion data segment comprises advancing motion data and a second time series motion data segment comprising following motion data,
a conversion amount in the motion direction of the advancing motion data provided at each time comprising the advancing motion conversion amount,
a conversion amount in the motion direction of the following motion data provided at each time comprising the following motion conversion amount,
motion data of a connection period unit from an end of the advancing motion data comprising advancing connection period motion data, and
motion data of a connection period unit from a beginning of the following motion data comprising following connection period motion data,
said motion data connecting method comprising:
calculating an overall position of an articulated rigid figure at a current time by
calculating a velocity vector and speed from an overall position in the advancing connection period motion data,
calculating a velocity vector and speed from an overall position in the following connection period motion data,
converting the velocity vector calculated from the advancing connection period motion data using the advancing motion conversion amount at the corresponding time, converting the velocity vector calculated from the following connection period motion data using the following motion conversion amount at the corresponding time, and then calculating a synthesized velocity vector by applying a velocity vector connection function to the converted velocity vector values,
calculating a synthesized speed by applying a speed connecting function to the speed calculated from the advancing connection period motion data, and the speed calculated from the following connection period motion data, and
adding a progression velocity vector, of which the direction is the synthesized velocity vector and the scalar is the synthesized speed, to the overall position of an articulated rigid figure at a time one before the current time;
calculating an overall attitude angle of the articulated rigid figure at the current time by
calculating an attitude vector from an overall attitude angle of the advancing connection period motion data,
calculating an attitude vector from an overall attitude angle of the following connection period motion data,
converting the attitude vector calculated from the advancing connection period motion data using the advancing conversion amount at the corresponding time, converting the attitude vector calculated from the following connection period motion data using the following conversion amount at the corresponding time, and then calculating a synthesized attitude vector by applying an attitude vector connecting function to the converted attitude vectors, and converting the synthesized attitude vector to a synthesized attitude angle; and calculating a sliding vector of a joint and joint angle of the articulated rigid figure at the current time by calculating a sliding direction and sliding distance from a sliding vector of a joint of the advancing connection period motion data, calculating a sliding direction and sliding distance from a sliding vector of a joint of the following connection period motion data, calculating a synthesized sliding direction and synthesized sliding distance by synthesizing the sliding direction and sliding distance of a joint of the advancing connection period motion data, and the sliding direction and sliding distance of a joint of the following connection period motion data, using a sliding direction connection function and sliding distance connection function, calculating a synthesized sliding vector from the synthesized sliding direction and synthesized sliding distance, and calculating a synthesized joint angle by applying said connection function to a joint angle of the advancing connection period motion data and a joint angle of the following connection period motion data.

8. The motion data connecting method according to claim 1, wherein a connection function is a differentiable, monotonic decreasing function ranging from 1 at the starting time of a connection period to 0 at the end of a connection period where a value in the connection period Sc is 180 degrees rotationally symmetric to a value at a midpoint time of the connection period.

9. The motion data connecting method according to claim 5, wherein a differentiable, monotonic decreasing function ranging from 1 at the starting time of a connection period to 0 at the end of a connection period where a value in the connection period Sc is 180 degrees rotationally symmetric to a value at a midpoint time of the connection period is used as the velocity vector connection function, speed connection function, attitude vector connection function, sliding direction connection function, and sliding distance connection function.

10. The motion data connecting method according to claim 1, wherein when the connection period is normalized to a period, the connection function is $(1+\cos(pt))/2$.

11. The motion data connecting method according to claim 1, wherein when the connection period is normalized to a period, the connection function is $((6t+3)t+1)(1-t)(1-t)(1-t)$.

12. The motion data connecting method according to claim 1, wherein when the connection period is normalized to a period, the connection function is $((((70t+35)t+15)t+5)t+1)(1-t)(1-t)(1-t)(1-t)(1-t)$.

13. The motion data connecting method according to claim 5, wherein when the connection period is normalized to a period, the velocity vector connection function, speed connection function, attitude vector connection function, sliding direction connection function, and sliding distance connection function is $(1+\cos(pt))/2$.

14. The motion data connecting method according to claim 5, wherein when the connection period is normalized to a period, the velocity vector connection function, speed connection function, attitude vector connection function, sliding direction connection function, and sliding distance connection function is $((6t+3)t+1)(1-t)(1-t)(1-t)$.

15. The motion data connecting method according to claim 5, wherein when the connection period is normalized to a period, the velocity vector connection function, speed connection function, attitude vector connection function, sliding direction connection function, and sliding distance connection function is $((((70t+35)t+15)t+5)t+1)(1-t)(1-t)(1-t)(1-t)(1-t)$.

16. The motion data connecting method according to claim 1, wherein a connection function is a differentiable, monotonic decreasing function ranging from 0 at the starting time of a connection period to 1 at the end of a connection period where a value in the connection period Sc is 180 degrees rotationally symmetric to a value at a midpoint time of the connection period.

17. The motion data connecting method according to claim 5, wherein a differentiable, monotonic decreasing function ranging from 0 at the starting time of a connection period to 1 at the end of a connection period where a value in the connection period Sc is 180 degrees rotationally symmetric to a value at a midpoint time of the connection period is used as the velocity vector connection function, speed connection function, attitude vector connection function, sliding direction connection function, and sliding distance connection function.

18. The motion data connecting method according to claim 1, wherein when the connection period is normalized to a period, the connection function is $(1-(1+\cos(pt))/2)$.

19. The motion data connecting method according to claim 1, wherein when the connection period is normalized to a period, the connection function is $1-((6t+3)t+1)(1-t)(1-t)(1-t)$.

20. The motion data connecting method according to claim 1, wherein when the connection period is normalized to a period, the connection function is $1-((((70t+35)t+15)t+5)t+1)(1-t)(1-t)(1-t)(1-t)(1-t)$.

21. The motion data connecting method according to claim 5, wherein when the connection period is normalized to a period, the velocity vector connection function, speed connection function, attitude vector connection function, sliding direction connection function, and sliding distance connection function is $(1-(1+\cos(pt))/2)$.

22. The motion data connecting method according to claim 5, wherein when the connection period is normalized to a period, the velocity vector connection function, speed connection function, attitude vector connection function, sliding direction connection function, and sliding distance connection function is $1-((6t+3)t+1)(1-t)(1-t)(1-t)$.

23. The motion data connecting method according to claim 5, wherein when the connection period is normalized to a period, the velocity vector connection function, speed connection function, attitude vector connection function, sliding direction connection function, and sliding distance connection function is $1-((((70t+35)t+15)t+5)t+1)(1-t)(1-t)(1-t)(1-t)(1-t)$.

24. A motion data connection apparatus for connecting, in an overlapping period, a first time series motion data indicative of movement of a subject having at least one joint, and a second time series motion data following and overlapping the first time series motion data for a particular time, said motion data connection apparatus comprising:

a means for calculating a first overlapping period motion data of the first time series motion data, and a second overlapping period motion data of the second time series motion data, in the overlapping period, and one of the following:

a means for calculating a position of said subject at a current time based on the first and second overlapping period motion data, a means for calculating an attitude angle of said subject at a current time based on the first and second overlapping period motion data, and a means for calculating a joint angle of a joint of the subject at the current time based on the first and second overlapping period motion data.

25. The motion data connection apparatus according to claim 24, wherein the means for calculating a position of said subject at the current time based on the first and second overlapping period motion data further comprises:
- a means for calculating a first velocity vector and a first speed of the subject in the overlapping period based on the first overlapping period motion data,
- a means for calculating a second velocity vector and a second speed of the subject in the overlapping period based on the second overlapping period motion data,
- a means for calculating a third velocity vector of the subject in the overlapping period by synthesizing the first velocity vector and the second velocity vector based on a particular connection function,
- a means for calculating a third speed of the subject in the overlapping period by synthesizing the first speed and the second based on said connection function, and
- a means for calculating the position of the subject at the current time based on the third velocity vector and the third speed.

26. The motion data connection apparatus according to claim 24, wherein the means for calculating an attitude angle AvS of said subject at a current time based on the first and second overlapping period motion data comprises:
- a means for calculating a first attitude vector of subject in overlapping period based on first overlapping period motion data,
- a means for calculating a second attitude vector of subject in overlapping period based on second overlapping period motion data,
- a means for calculating a third attitude vector of subject in overlapping period by synthesizing first attitude vector and second attitude vector based on a particular connection function, and
- a means for calculating a third attitude vector indicative of an attitude of subject in overlapping period based on third attitude vector.

27. The motion data connection apparatus according to claim 24, wherein the means for calculating a sliding vector and a joint angle of a joint of subject at a current time based on the first and second overlapping period motion data comprises:
- a means for calculating a first sliding direction and a first sliding distance of a joint of subject in overlapping period based on first overlapping period motion data,
- a means for calculating a second sliding direction and a second sliding distance of a joint of subject in overlapping period based on second overlapping period motion data,
- a means for calculating a third sliding direction, a third sliding distance, and sliding vector of subject in overlapping period by synthesizing first sliding direction, first sliding distance, second sliding direction, and second sliding distance, and
- a means for calculating sliding vector and third joint angle of subject in overlapping period by synthesizing based on connection function a first joint angle of first overlapping period motion data and a second joint angle of second overlapping period motion data.

28. A motion data connection apparatus for connecting, in an overlapping period, a first time series motion data indicative of movement of a subject having at least one joint, and a second time series motion data following and overlapping first time series motion data for a particular time, said motion data connection apparatus comprising
- a period motion data calculator that calculates a first overlapping period motion data of the first time series motion data, and a second overlapping period motion data of the second time series motion data, in the overlapping period, and one of the following:
  - a first position calculator that calculates a position of the subject at a current time based on the first and second overlapping period motion data,
  - an attitude angle calculator that calculates an attitude angle of the subject at the current time based on the first and second overlapping period motion data, and
  - a joint angle calculator that calculates a joint angle of a joint of the subject at the current time based on the first and second overlapping period motion data.

29. The motion data connection apparatus according to claim 28, wherein the attitude angle calculator further comprises:
- a first attitude vector calculator that calculates a first attitude vector of the subject in the overlapping period based on the first overlapping period motion data,
- a second attitude vector calculater that calculates a second attitude vector of the subject in the overlapping period based on the second overlapping period motion data,
- a third attitude vector calculator that calculates a third attitude vector of the subject in the overlapping period by synthesizing the first attitude vector and the second attitude vector based on a particular connection function, and
- a fourth attitude vector calculator that calculates a third attitude vector indicative of an attitude of the subject in the overlapping period based on the third attitude vector.

30. The motion data apparatus according to claim 28, wherein the joint angle calculator calculates a sliding vector of the joint of the subject at the current time based on the first and second overlapping period motion data, and further comprises:
- a first calculator that calculates a first sliding direction and a first sliding distance of a joint of the subject in the overlapping period based on the first overlapping period of motion data;
- a second calculator that calculates a second sliding direction and a second sliding distance of a joint of the subject in the overlapping period based on the second overlapping period motion data;
- a third calculator that calculates a third sliding direction, a third sliding distance, and a sliding vector of the subject in the overlapping period by synthesizing the first sliding direction, the first sliding distance, the second sliding direction, and the second sliding distance; and
- a fourth calculator that calculates a sliding vector and a third joint angle of the subject in the overlapping period by synthesizing based on the connection function a first joint angle of the first overlapping period motion data and a second joint angle of the second overlapping period motion data.

31. The motion data connection apparatus according to claim 28, wherein the first position calculator further comprises:
- a first velocity vector calculator that calculates a first velocity vector and a first speed of the subject in the overlapping period based on the first overlapping period motion data, a second velocity vector calculator that calculates a second velocity vector and a second speed of the subject in the overlapping period based on the second overlapping period motion data, a third velocity vector calculator that calculates a third velocity vector of the subject in the overlapping period by synthesizing the first velocity vector and the second velocity vector based on a particular connection function, a third speed calculator that calculates a third speed of the subject in the overlapping period by synthesizing the first speed and the second speed based on the connection function, and a second position calculator that calculates the position of the subject at the current time based on the third velocity vector and the third speed.

* * * * *

UNITED STATES PATENT AND TRADEMARK OFFICE
CERTIFICATE OF CORRECTION

PATENT NO. : 6,246,420 B1
DATED : June 12, 2001
INVENTOR(S) : Y. Mochizuki et al.

It is certified that error appears in the above-identified patent and that said Letters Patent is hereby corrected as shown below:

<u>Title page,</u>
Item [56], References Cited, OTHER PUBLICATIONS, "Corretion" should be
-- Correction --.

<u>Column 13,</u>
Line 10, "calculation" should be -- calculating --.

<u>Column 17,</u>
Lines 45, 48, 52, 56 and 62, before "period" insert -- [0,1] --.

<u>Column 18,</u>
Lines 1, 25, 28, 32, 36, 42 and 48, before "period" insert -- [0,1] --.

<u>Column 19,</u>
Line 20, after "second" insert -- speed --.

<u>Column 20,</u>
Line 24, "calculater" should be -- calculator --.

Signed and Sealed this

Twenty-fifth Day of June, 2002

*Attest:*

JAMES E. ROGAN
*Director of the United States Patent and Trademark Office*

*Attesting Officer*